(12) United States Patent
Upendran et al.

(10) Patent No.: US 9,392,422 B2
(45) Date of Patent: Jul. 12, 2016

(54) MULTI-TENANT MESSAGE ROUTING AND MANAGEMENT

(71) Applicant: Apollo Group, Inc., Phoenix, AZ (US)

(72) Inventors: Manish Upendran, San Jose, CA (US);
Joe Koberstein, Tempe, AZ (US); Bryce Griner, Mesa, AZ (US); Sachin Garg, Laveen, AZ (US)

(73) Assignee: Apollo Education Group, Inc., Phoenix, AZ (US)

( * ) Notice: Subject to any disclaimer, the term of this patent is extended or adjusted under 35 U.S.C. 154(b) by 525 days.

(21) Appl. No.: 13/887,473

(22) Filed: May 6, 2013

(65) Prior Publication Data

US 2014/0273994 A1 Sep. 18, 2014

Related U.S. Application Data

(60) Provisional application No. 61/802,021, filed on Mar. 15, 2013.

(51) Int. Cl.
*H04M 1/00* (2006.01)
*H04W 4/12* (2009.01)

(52) U.S. Cl.
CPC ..................................... *H04W 4/12* (2013.01)

(58) Field of Classification Search
CPC ...... H04L 51/00; H04L 51/063; H04L 51/066; H04L 51/06; H04L 45/72; H04L 45/16
USPC .................................................. 370/389, 390
See application file for complete search history.

(56) References Cited

U.S. PATENT DOCUMENTS 9,088,532 B1 * 7/2015 Dorsey .................. H04L 51/066

* cited by examiner

*Primary Examiner* — Kwasi Karikari
*Assistant Examiner* — Randy Peaches
(74) *Attorney, Agent, or Firm* — Hickman Palermo Becker Bingham LLP

(57) ABSTRACT

A system and method are provided for a routing system that enables a tenant service provider to send events to users, using applications, on one or more devices. Events may include be any message or data intended to be sent to one or more users. Specifically, a tenant service provider may send events to users on various devices without the tenant service provider being aware of the device, or type of device, that the user is using. The tenant service provider need not have any knowledge of the specific users that may receive the events sent by the tenant service provider. Thus, a tenant service provider may disseminate events to users on various devices by sending a single message to a routing service. The routing service may then distribute the event to each of the devices and each of the applications each user has selected.

24 Claims, 6 Drawing Sheets

MULTI-TENANT MESSAGE ROUTING AND MANAGEMENT

CROSS-REFERENCE TO RELATED APPLICATIONS

Benefit Claim

This application claims the benefit under 35 U.S.C. §119(e) of application 61/802,021, filed Mar. 15, 2013, the entire contents of which is hereby incorporated by reference for all purposes as if fully set forth herein.

FIELD OF THE INVENTION

The present invention generally relates to message routing, and more specifically, to multi-tenant message routing and management.

BACKGROUND

Routing services forward messages from a content provider to a particular device. For example, a content provider may send a request, which includes a message and identifies a particular device, to a routing service. In response to receiving the request from the content provider, the routing service may forward the message to the particular device.

Unfortunately, to use this technique, content providers must keep track of the devices to which the content provider wishes to send messages. Content providers must also update all information related to each device to which the content provider wishes to send a message. For example, a content provider may develop a publish/subscribe system that receives subscription requests from users. If an error arises while a user attempts to subscribe to receive messages from the content provider, the content provider may be unable to provide the necessary information to the routing service to send the user messages. Furthermore, the publish/subscribe system may receive unsubscribe requests from users to stop receiving messages. If an error arises while a user requests to stop receiving messages from the content provider, then the content provider may continue to send messages to the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
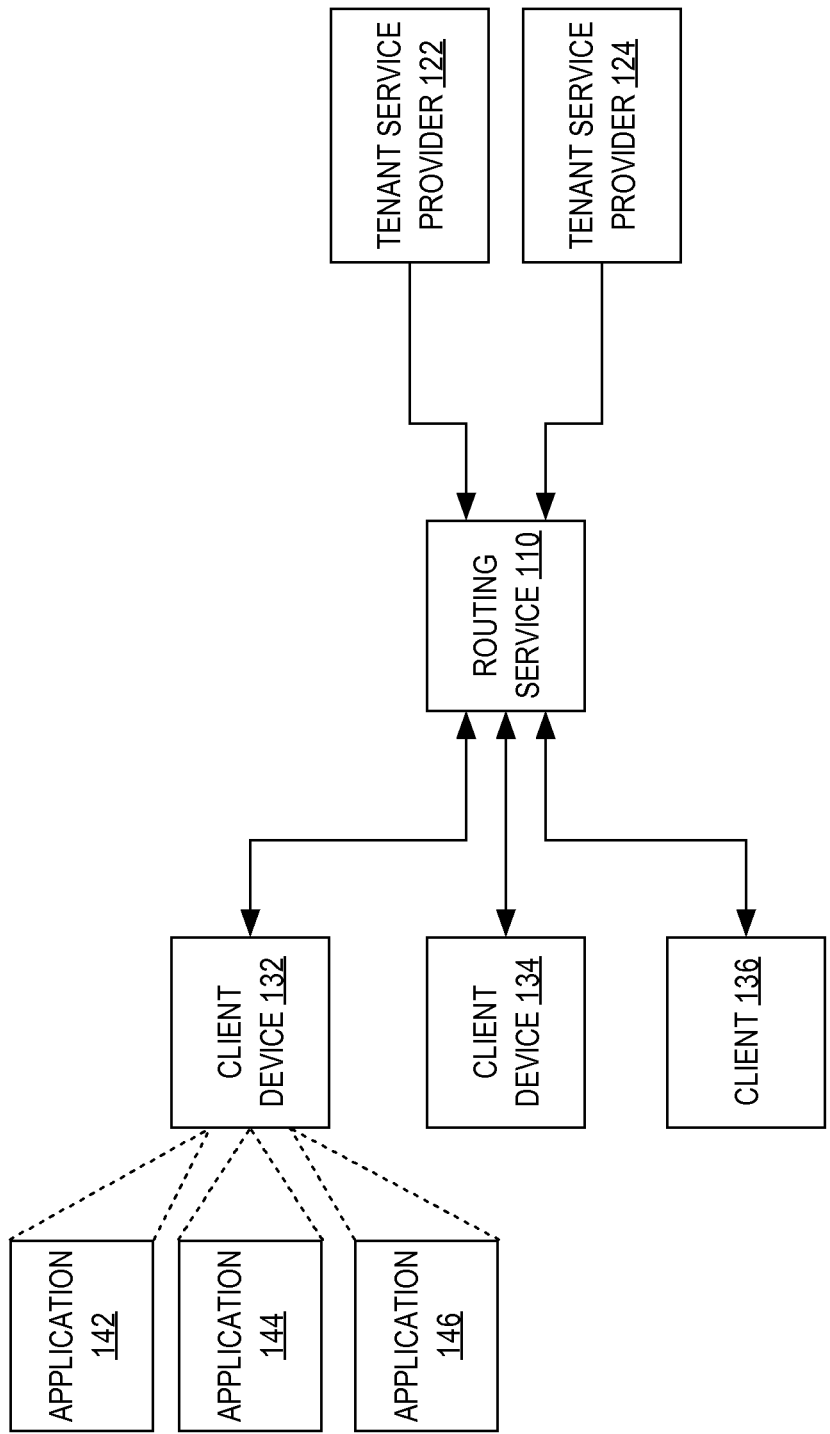
FIG. 1 illustrates a system including a routing service, tenant service providers, client devices, and applications, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A routing system is provided that enables a tenant service provider to send events to users, using applications, on one or more devices. Events may include any message or data intended to be sent to one or more users. Specifically, a tenant service provider may send events to users on various devices without the tenant service provider being aware of the device, or type of device, that the user is using. Furthermore, the tenant service provider need not have any knowledge of the specific users or devices that may receive the events sent by the tenant service provider.

A tenant service provider may be a business or other entity that provides data to users on a variety of devices. For example, a tenant service provider may be a school. The school may wish to provide its students with various messages or data, such as alerts when grades are released or emergencies.

A tenant service provider may disseminate events to users on various devices by sending a single message to a routing service. An event may identify one or more applications to send the event to, but need not include any information identifying particular users or devices. The routing service, based at least in part on the one or more applications identified, may first determine which users, on which devices, through which of the one or more applications have opted to receive the types of events being sent by the tenant service provider. The routing service may then distribute the event to each of the users on each of the devices, through each of the one or more applications identified by the event, and which the user has selected.

Users may choose the applications and devices through which they intend to receive particular types of events, by sending preference data comprising particular identifiers to the routing service. The identifiers may include one or more "intent data objects", a user identifier, a device identifier, and an application identifier. An intent data object identifies the type of events the user wishes to receive. For example, a student may send the routing service an intent data object, a user identifier, a device identifier, and an application identifier indicating that she would like to receive events regarding school activities on her cell phone, via a particular mobile application.

System Overview

A routing service receives an event from a tenant service provider and disseminates the event to one or more users, through one or more applications running on one or more devices. For example, a routing service may receive an event from a tenant service provider with a particular intent data object and a payload. The particular intent data object may identify the type of event, e.g., campus alerts. The routing service may forward the event to all users that have requested to receive events with the particular intent data object, through the applications and devices selected by each user.

The payload can be any data, e.g., a short message stating that campus will be closed for a particular holiday.

FIG. 1 illustrates a system including a routing service, tenant service providers, client devices, and applications, according to an embodiment. While FIG. 1 illustrates an embodiment for purposes of illustrating a clear example, other embodiments may omit, add to, reorder, and/or modify any of the structures or steps shown. System 100 includes routing service 110, tenant service providers 120, client devices 130, and applications 140.

Routing service 110 is communicatively coupled with tenant service providers 120 and may receive events from tenant service providers 120. For example, tenant service provider 122 may be a college. The college may send routing service events through an application programming interface to routing service 110. Or, routing service 110 may include a front end interface (e.g., a web page) for persons representing the school (e.g., a school administrator) to send events.

Routing service 110 is communicatively coupled with client devices 130. Client devices 130 may be any device running one or more applications that a user may receive events through. For example, client device 132 may be a mobile phone, client device 134 may be a desktop computer, and client device 136 may be a tablet.

Applications

Routing service 110 is also communicatively coupled to applications 140 through client devices 130. For example, application 141 may be a mobile application running on client device 132. Application 141 may be communicatively coupled to routing service 110 through client device 132 via a wireless internet service provider. Also for example, application 144 may be a desktop application running client device 134. Application 141 may be communicatively coupled to routing service 110 through a wide area network, or the Internet.

Applications 140 may be created by either a tenant service provider, or another developer. For example, application 141 may be an educational application created by tenant service provider 122 (a college) to alert students to particularly important dates. Also for example, application 144 may be a sports application created by a sports-news company that aggregates sports scores and alerts from many different clubs and organizations like the college.

Applications 140 may have one or more users. Each application, of applications 140, may send preference data to routing service 110 for each user using the application. For example, application 141 may have a first user that logs in to application 141 with a first user identifier. Application 141 may also have a second user that logs into application 141 with a second user identifier. Application 141 may send preference data on behalf of the first user indicating which types of events the first user would like to receive through application 141 on client device 132. Application 141 may also send preference data on behalf of the second user indicating which types of events the second user would like to receive through application 141 on client device 132.

Likewise, each application, of applications 140, may receive events from routing service 110 for each of the application's users. For example, if the first user, based on the preference data sent on behalf of the first user to routing service 110, opted to receive events regarding a particular event type, then routing service 110 may send an event of that type to application 141 for the first user. Furthermore, if the second user, based on the preference data sent on behalf of the second user to routing service 110, opted to receive events regarding the same particular event type, then the routing service 110 may send the same event to application 141 for the second user.

Furthermore, the protocols used by applications 140 and devices 130 may vary from application to application and from device to device. Tenant service providers 120 need not retain any particular information regarding which devices will receive an event or the correct protocol to use. For example, suppose client device 132 is a mobile phone which receives alerts through a push notification system, and client device 134 is a desktop computer, and may receive alerts through using a hypertext transfer protocol or another web service. Upon receiving an event from tenant service provider 122, routing service 110 sends the event to each device and application through the correct protocol defined by each receiving application and/or device. Routing service 110 may determine which protocol to use for each application and/or device based, at least in part, on the preference data, which includes an application identifier and a device identifier.

Preference Data

The routing service determines which events to send to which users, applications, and devices based, at least in part, on the preference data stored at the routing service. A preference record may include, but is in no way limited to, one or more intent data objects, a user identifier, an application identifier, and a device identifier. The routing service may disseminate events received based, at least in part, on the user identifier, application identifier, and device identifier in each preference record.

Preference data may be stored in a repository. In an embodiment, the repository may be table in a database. Alternatively, the repository may include a relational database, flat file, no-SQL database, or any other system to store information.

Figure 2:
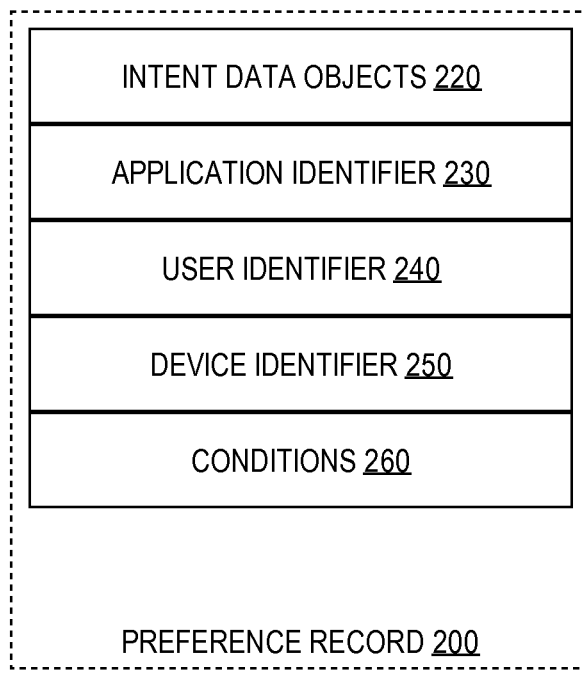
FIG. 2 illustrates a preference record in a preference data table, according to an embodiment.

FIG. 2 illustrates a preference record in a preference data table, according to an embodiment. While FIG. 2 illustrates an embodiment for purposes of illustrating clear example, other embodiments may omit, add to, reorder, and/or modify any of the features shown. Preference record 200 includes intent data objects 220, application identifier 230, user identifier 240, device identifier 250, and conditions 260.

User-Provided Intent Data Objects

Intent data objects 220 identify one or more types of events a user wants to receive. For example, one intent data object may indicate that the user wants to be notified when messages are posted for an online Spanish course. Another intent data object may indicate that the user wants to be notified when grades are posted for an online Math course.

Intent data objects 220 may identify a type of event using a number, string, hash, JavaScript object notation object, or any other identifier. For example, assume that the intent data objects 220, in preference record 200, include an intent data object that specifies "100". The intent object that specifies "100" indicates that the user associated with preference record 200 is to receive events associated with the identifier "100". Similarly, if intent data objects 220 specify "100, 200", then the user is to receive all events that associated with either the identifier "100" or the identifier "200".

Storing the intent data objects 220 as strings may be helpful in boosting the efficiency of the routing service. Since the routing service may forward a single event to multiple users, devices, and applications, the throughput of the routing service may improve by efficiently querying the preference records, for matching intent data objects, when an event is received.

Furthermore, new intent data objects 220 may be created on the fly and need not be known by the routing service beforehand. Thus, a tenant service provider and an application need not register or alert the routing service before the tenant service provider and an application begin or stop using one or more particular intent data objects. For example, a tenant service provider may publish a new list of intent data objects along with definitions for each intent data object published. A user may submit preference data with a particular intent data object that was published by the tenant service provider, but that has not been registered or stored with the routing service beforehand. Subsequently, the routing service may receive an event with the particular intent data object. In response to receiving the event with the particular intent data object, the routing service may query for preference records that include the particular intent data object. The routing service may forward the event to each user, application, and device for each preference record found with the particular intent data object.

User-Provided Application Identifiers

Application identifier 230 is an identifier that identifies the application through which a user wishes to receive particular types of events. Application identifier 230 may be hardcoded into an application or may be located in memory or storage on the device the application is running on.

All versions of the same application may have the same application identifier. For example, before an application is released it is provisioned and assigned a unique application identifier. As new versions of the application are released, the application identifier for the application may remain constant. Alternatively, each version of an application may have a different application identifier. For example, a version of an application written for mobile phones may have a different application identifier than the desktop computer version of the same application. Furthermore, the application identifier may change between versions of the application written for the same platform. For example, the first version of an application released for mobile devices may be assigned a first application identifier, but a subsequent, second version of the application for the same mobile device may have a different, second application identifier.

An application identifier may be assigned to an application through provisioning. For example, a tenant service provider or a software vendor may request to receive an application identifier from the routing service before the application is released. Alternatively, an application may be provisioned after it is released. For example, after its release, the application may be provisioned, and the assigned application identifier may be disseminated to copies of the application already distributed. Provisioning may be an offline process or may be an automated service.

User Identifier

User identifier 240 may by an email address, a user name, or any other identifier that an application may use to identify a user. The routing service may determine the appropriate protocol and service to use to disseminate events to each application. If a user identifier 240 is unique for each application identifier 230, each user using the application with application identifier 230 may receive a separate copy of an event. For example, suppose two preference records each include the same device identifier, the same application identifier, "APP0001", and the same intent data object, "100". Also, assume that the first record includes a user identifier set to "1". Furthermore, assume that the second record includes a user identifier set to "2". Upon receiving an event with an intent data object "100", the routing service may send the event to the same application twice, once for the first user and once for the second user.

The tenant service provider need not be aware the particular users that will receive an event. Furthermore, the tenant provider may not have any records of which users are receiving which messages. Thus, the routing service insulates the tenant service provider from the details of sending events to particular users, allowing the tenant service provider to focus on developing the event data, application, or other resources, instead of getting bogged down in determining and tracking which users are receiving which events.

Additionally or alternatively, a user identifier may not be defined, indicating that any event targeting a particular application may be sent to any user using the particular application. For example, an eBook reader application may not define user identifier 240, and thus any user of the eBook reader application may receive an event that is targeted to the eBook reader application.

Device Identifier

Device identifier 250 identifies a device. Device identifier 250 may use any type of information to identify a device, including but not limited to the type of device, brand, generic name, serial number, etc. Based on the device identifier, the routing service may determine the appropriate protocol and service to use to disseminate events to each application running on each device. For example, suppose two preference records each include the same application identifier, "APP0001", and the same intent data object, "100". Also, assume that the first record includes a device identifier set to "1". Furthermore, assume that the second record includes a device identifier set to "2". Upon receiving an event with an intent data object "100" and application identifier "APP0001", the routing service may send the event to both of the devices using the appropriate protocol for each application identifier and/or device identifier.

The tenant service provider need not be aware the particular devices that will receive an event. Furthermore, the tenant provider may not have any records of which devices are receiving which messages. Thus, the routing service insulates the tenant service provider from the details of sending events to particular devices, allowing the tenant service provider to focus on developing the event data, application, or other resources, instead of getting bogged down in determining and tracking which devices are receiving which events. Furthermore, the tenant service provider does not need to keep track of protocols necessary to disseminate the events to each of the applications running on each device, because the routing service may send all of the messages to the appropriate devices, through the appropriate protocols.

Conditions

Conditions 260 specify particular conditions under which users, applications, or devices may receive particular types of events. For example, assume a user has a sports application for receiving and displaying sports scores. Further assume that the sports application runs on the user's mobile phone. The user may submit preference data that includes an intent data object corresponding to events relating to sport scores, a user identifier identifying the user, an application identifier identifying the sports application, and a device identifier identifying the mobile phone. The preference data may also include a condition that indicates to the routing service not to send events to the user, through the sports application, running on the mobile phone, during particular times of the day.

Events

Figure 3:
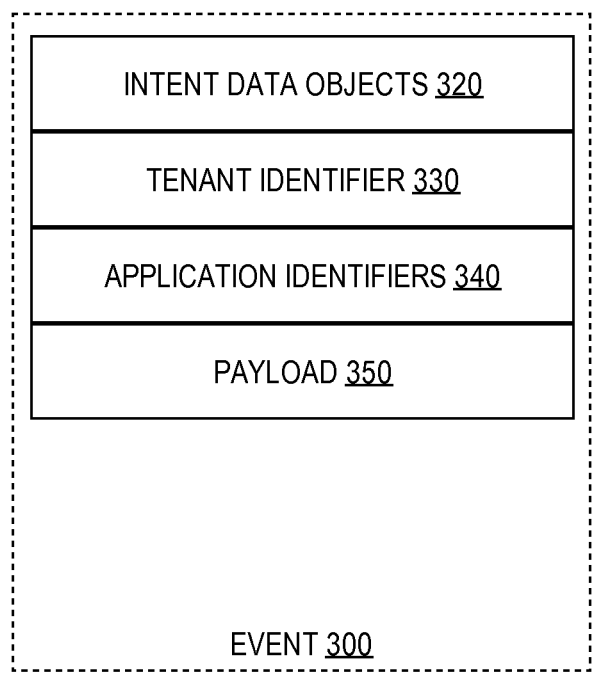
FIG. 3 illustrates an event, according to an embodiment.

The routing service receives events, from tenant service providers, and forwards the events to one or more users, on one or more devices, through one or more applications. The routing service may determine which events to send to which users based, at least in part, on the data included in each event. FIG. 3 illustrates an event, according to an embodiment. While FIG. 3 illustrates an embodiment for purposes of illustrating clear example, other embodiments may omit, add to, reorder, and/or modify any of the features shown. Event 300 includes intent data objects 320, tenant identifier 330, application identifiers 340, and payload 350. Unlike preference record 200, illustrated in FIG. 2, event 300 does not include a device identifier. Thus, a tenant service provider need not have any information regarding the users or devices an event will be sent to. However, the routing service may be aware of the users and devices, and which protocols and services to use to send messages to each device.

Tenant-Provided Intent Data Objects

Just as intent data objects indicate the type of content users want to receive, intent data objects are also used to indicate the type of content tenant service providers are providing. Specifically, intent data objects 320 allow tenant service providers to categorize events into various types of events, in order to provide users with a customized experience. For example, assume that a tenant service provider is a school that distributes an application to students, where the application is capable of receiving updates on school sports, social events, emergencies, or general notices. Further assume the intent data objects for those types of events are "1001", "1002", "1003", and "1004", respectively. The routing service, upon receiving event 300, with intent data objects 320 set to "1001, 1002", may query the preference data repository for all user, application, and device combinations that have chosen to receive events with intent data objects set to "1001" or "1002". Intent data objects 320 need not be numeric. An intent data object may be any format, as discussed above with respect to intent data objects 220.

Tenant service providers may use wildcards, in place of intent data objects, to indicate that the routing device should not use any particular intent data object to determine which users, applications, or devices to forward an event to. A wildcard may be denoted by a particular string, e.g., "*" or "wildcard". For example, the routing service, upon receiving event 300, with intent data objects 320 set to "*", need not filter records in the preference data repository based on any particular intent data object. Alternatively, a wildcard may be denoted by failing to include intent data objects 320 or leaving intent data objects 320 blank.

Tenant Identifier

Tenant identifier 330 generally represents an identifier that identifies a particular tenant service provider. A tenant identifier may be assigned to a tenant service provider through provisioning. For example, a tenant service provider may request to receive a tenant identifier from the routing service. The routing service may provision the tenant service provider by assigning the tenant service provider a tenant identifier. Provisioning a tenant service provider may be an offline process or may be an automated service.

The routing service may require a tenant service provider to be provisioned and to supply a valid tenant identifier before the routing service forwards any events received by the tenant service provider. For example, assume the routing service receives event 300, which includes tenant identifier 330. Also assume that tenant identifier 330 is set to a string that has not been assigned to any tenant service provider. The routing service may ignore event 300, since tenant identifier 330 does not include a tenant identifier that was assigned to a provisioned tenant service provider.

Tenant-Provided Application Identifiers

Application identifiers 340 may include one or more identifiers that identify one or more applications that event 300 should be sent to. For example, assume that a routing service receives event 300 with application identifiers 340 set to "APP0001, APP0002". The routing service may query the preference data repository for applications with one of the application identifiers "APP0001, APP0002".

A routing service may also use application identifiers 340 as a security measure. For example, a routing service may store data that indicates the applications to which each tenant may send messages. Based on that data, the routing service may ignore an event received from a tenant service provider that is not authorized to send events to the applications identified by application identifiers 340.

The routing service may authorize one or more tenant service providers to send events to an application as part of the application provisioning process. For example, when an application is provisioned as previously discussed, particular tenant identifiers may be associated with the application.

The tenant service providers associated with an application may be authorized to send events to the application. The routing service may ignore events received from tenant service providers that are not associated with the application. For example, assume that a particular school distributes an application to alert its students when grades are released. Also assume that a routing service provisions the school and the application, assigning the school a tenant identifier and the application an application identifier. Further assume that the routing service associates the tenant identifier with the application identifier. Further still, assume that the routing service receives event 300, which includes tenant identifier 330 and application identifiers 340, which identify the school and the application, respectively. Upon determining that the tenant identifier is associated with the application identifier, the routing service may continue to process and disseminate the event accordingly. Otherwise, the routing service may ignore the event.

If an event from a tenant service includes multiple application identifiers, not all of which are associated with the tenant identifier 330, then the routing service need not disseminate the event to the applications not associated with the tenant identifier 330. Using the previous example, assume that application identifiers 340 also include a second application identifier that is not associated with the school's tenant identifier. The routing service may ignore the second application identifier and proceed to process the event as if application identifiers 340 only included the first application identifier, which is associated with the school's tenant identifier. Alternatively, the routing service may ignore the entire event if at least one of the application identifiers included in application identifiers 340 is not associated with the school's tenant identifier.

Figure 4:
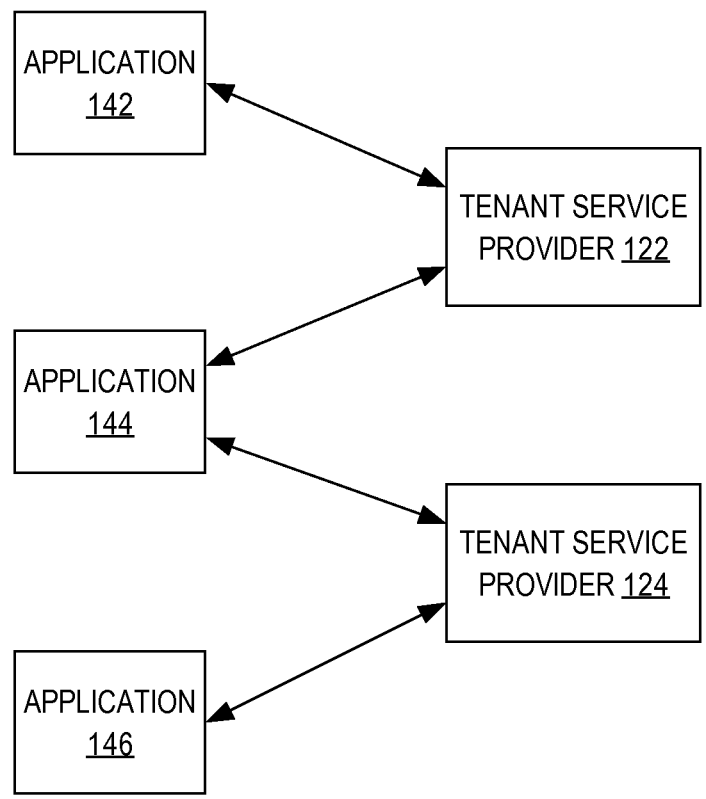
FIG. 4 illustrates associations between applications and tenant service providers, according to an embodiment.

A tenant service provider may be associated with more than one application, and an application may be associated with more than one tenant service provider. FIG. 4 illustrates associations between applications and tenant service providers, according to an embodiment. While FIG. 4 illustrates an embodiment for purposes of illustrating clear example, other embodiments may omit, add to, reorder, and/or modify any of the features shown. For purposes of illustrating a clear example, FIG. 4 may be described with reference to FIG. 1, but using the particular arrangement of FIG. 1 is not required in other embodiments. In FIG. 4, tenant service provider 122 is associated with both application 142 and application 144; and tenant service provider 124 is associated with application 144 and application 146. Thus, routing service 110, upon receiving an event from tenant service provider 122, may forward the event to either application 142 or application 144. Likewise, routing service 110, upon receiving an event from tenant service provider 124, may forward the event to either application 144 or application 146. Notice, in this example, that application 144 is associated with both tenant service provider 122 and tenant service provider 124. Accordingly, either tenant service provider 122 or tenant service provider 124 may send events to application 144. For example, if routing service 110 receives event 300, wherein tenant identifier 330 contains the tenant identifier for tenant service provider 122, then routing service 110 may forward to users using either application 142 or application 144.

Wildcards may be used to indicate that the routing device should forward the event to all applications associated with tenant identifier 330. A wildcard may be denoted by a particular string, e.g., "*" or "wildcard". For example, the routing service, upon receiving event 300, with application identifiers 340 set to "*", need not filter records in the preference data repository based on any particular application identifier. Alternatively, a wildcard may be denoted by failing to include application identifiers 340 or leaving application identifiers 340 blank.

In an embodiment, the routing service may send events to one or more applications regardless of the tenant service provider. For example, when a routing service provisions a particular application, the routing service need not associate the application identifier, assigned the particular application, to a tenant identifier, assigned to a particular tenant service provider. Thus, in response to receiving an event 300, wherein application identifiers 340 includes the application identifier assigned to the particular application, the routing service need not determine whether tenant identifier 330 is associated with application identifiers 340 before forwarding event 300.

Payload

Payload 350 may be any amount of data in any format. For example, payload 350 may be a text string, "Grades are out!" Also for example, payload 350 may be an image. Further, for example, the payload may be a combination of various data, including images, text, videos, audio files, data records, web pages, and/or links to web pages. Payload 350 may also be in a proprietary format.

Additionally or alternatively, the payload may also include one or more instructions or identifiers. For example, a payload containing the following string: "c123445: Grade posted for Class A", may instruct a receiving application to fetch more details for event using the identifier "c123445".

Routing Lookup

In one embodiment, when the routing service receives an event from a tenant service provider, the routing service determines to whom to send the event, on which devices, through which applications. The determination of to whom to send the event may be based on whether:
(a) the (tenant-provided intent data object, tenant-provided application identifier) combination matches
(b) the (user-provided intent data object, user-provided application identifier) combination
of any preference records.

For the matching data preference records, the routing service determines whether all conditions in the matching data preference records are satisfied. A matching preference record whose conditions are satisfied is referred to herein as a "recipient preference record".

From the recipient preference records, the (unique user identifier, device identifier, and application identifier) combinations are retrieved. The (unique user identifier, device identifier, and application identifier) combination specified in a recipient data preference record is referred to herein as the "recipient identifier". The routing service then forwards the event to each recipient identifier.

The following are some examples of the various results that can occur when the routing service forwards an event to each recipient identifier:
 A user may receive an event on a device through an application.
 A user may receive the same event multiple times through multiple applications running on the same device.
 A user may receive the same event multiple times through the same application, running on multiple devices.
 A user may receive the same event multiple times through multiple applications, running on multiple devices.
 Multiple users may receive the same event on the same device through the same application.
 Multiple users may receive the same event on the same device through multiple applications.
 Multiple users may receive the same event on multiple devices through the same application running on each device.
 Multiple users may receive the same event on multiple devices through multiple applications running on each device.

As mentioned above, the routing service filters the matching preference records based on the conditions in each preference record, if any. For example, a preference record may indicate that an event should not be forwarded to a particular user identifier, device identifier, and application identifier combination between 10:00 PM and 8:00 AM the following day.

In the case where the routing service performs condition filtering before performing the matching operation, the routing service need not retrieve the record from the repository if an event is received at 11:00 PM. In the case where the routing service performs condition filtering after the matching operation, the routing service may retrieve the record from the repository, but does not forward the event to the user, device, and application specified in the record.

The routing service may restrict duplicate events from being sent to the same recipient identifier. The routing service may also restrict duplicate preference records from being stored with the same user, device, application, combination.

If the routing service receives a new preference data with the same (user, device, application) combination as an existing record, then the routing service may update the existing preference record rather than store a new record. For example, the update may change the intent data objects stored in the record or the conditions. Alternatively, each preference record may have a unique (user identifier, device identifier, application identifier, and intent data object) combination.

Exemplary Process

Figure 5:
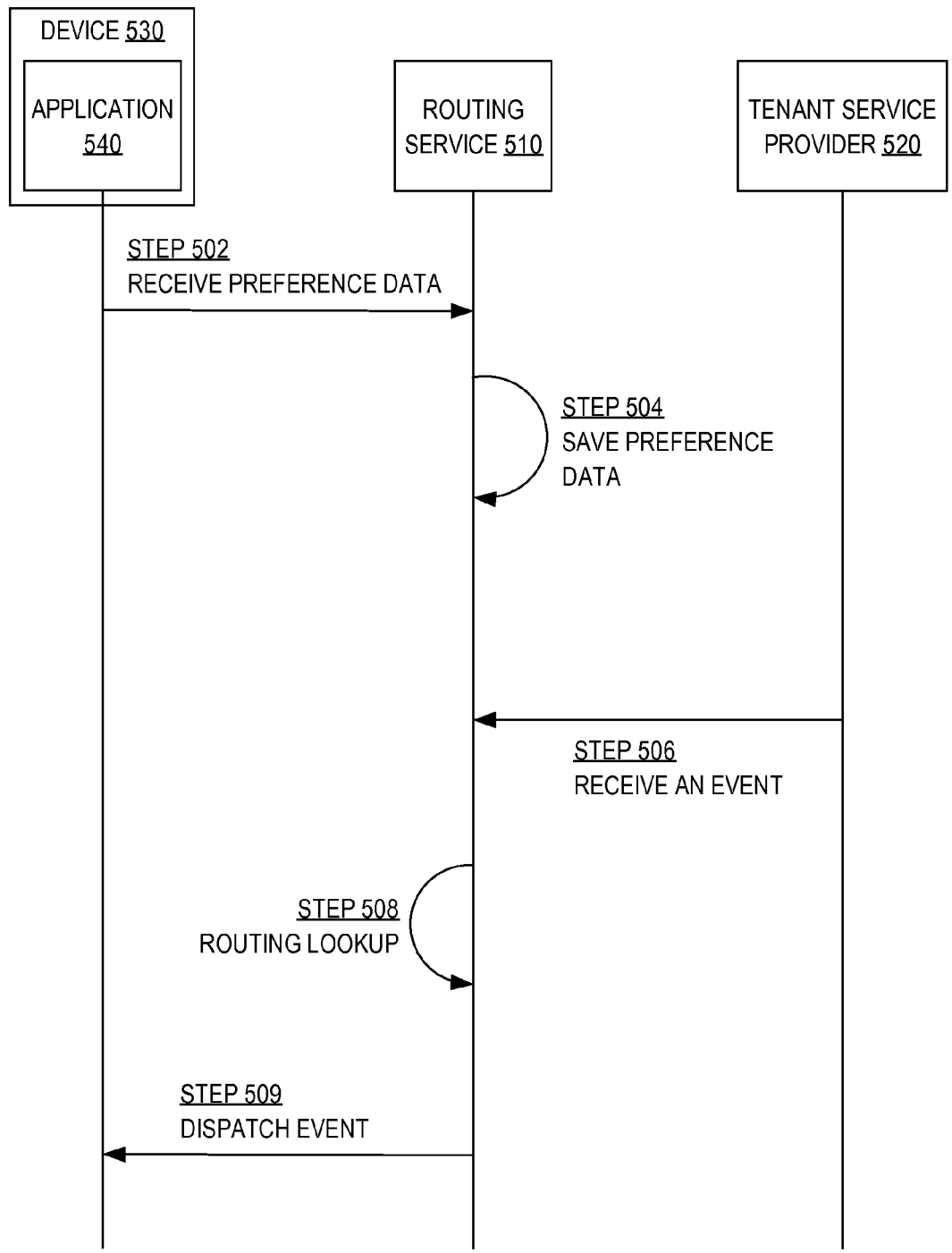
FIG. 5 is an illustration of a routing service, a client, and a tenant service provider, and a process for sending an event from the tenant to the client through the routing service, according to an embodiment.

FIG. 5 is an illustration of a routing service, a device, an application running on the device, and a tenant service provider, and a process for sending an event from the tenant to the client through the routing service, according to an embodiment. While FIG. 5 illustrates one embodiment for purposes of illustrating a clear example, other embodiments may omit, add to, reorder and/or modify any of the structures shown.

In FIG. 5, Routing service 510 is a routing service as discussed above. Routing service 510 receives preference information, and stores the preference information in a repository to be queried. As explained above, routing service 510 may receive events from tenant service providers, and send events to users through one or more applications on a device. The events need not identify users or devices, Application 540 is a client application. Application 540 is executed on a particular device 530, controlled by a user. For example, application 540 may be an application on running on a mobile phone. Application 540 may submit preference data to routing service 510. Application 540 may receive events from routing service 510.

Tenant service provider 520 is a tenant service provider that sends events to clients, such as application 540, through routing service 510.

In the embodiment illustrated in FIG. 5, routing service 510 has already provisioned both tenant service provider 520 and application 540. Accordingly, routing service 510 has assigned an application identifier to application 540, which in this example, will be "111". Routing service 510 has assigned a tenant identifier to tenant service provider 520, which in the example will be "555". Furthermore routing service 510 has associated application identifier "111" with tenant identifier "555" for the tenant service provider 520 to indicate that tenant service provider 520 is authorized to send events to application 540.

FIG. 5 illustrates a series of transactions between routing service 510, application 540, and tenant service provider 520. While FIG. 5 illustrates one embodiment for purposes of illustrating a clear example, other embodiments may omit, add to, reorder and/or modify any of the structures shown.

In step 502: Routing service 510 receives from application 540 preference data. For example, routing service 510 may receive from application 540, a user identifier that identifies a user, an application identifier that identifies provisioned application 540, and a device identifier that identifies device 530 that application 540 is running on. Furthermore, the preference data includes an intent data object, which in this example is "999".

In step 504: Routing service 510 stores the preference data as a preference record in a preference data repository. The preference data repository may be stored locally to, or remotely from, routing service 510.

In step 506: Routing service 510 receives an event from tenant service provider 520. The event includes the tenant identifier "555", the application identifier "111", the intent data object "999", and a payload. The payload in this example is some text, "Grades are out!"

In step 508: Routing service 510 first determines whether or not tenant service provider 520 is authorized to send events to applications with application identifier "111". Since the tenant identifier "555" is associated with application identifier "111" routing service 110 determines that tenant service provider 520 is authorized to send events to applications identified as "111". Next, routing service 510 queries the repository to find all unique combinations of users, applications, and devices, wherein the application identifier is "111", and wherein the intent data objects include "999". Accordingly, the preference record stored in response to receiving the preference data from application 540 in step 102 is retrieved since the application 540 has the application identifier "111".

In an embodiment, wherein one or more of the matching preference records include conditions, routing service 510 may also determine whether the conditions are satisfied. The matching preference records that include conditions that are not satisfied are filtered out, leaving only those matching preference records that (a) specify no conditions, or (b) specify conditions that are satisfied.

In step 509: Routing service 510 forwards the event received from tenant service provider in step 506 to the recipient identifiers, which in the present example would cause the event to be sent to application 540. Accordingly, application 540 may display the payload "Grades are out!" to the user identified in the preference record using application 540.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
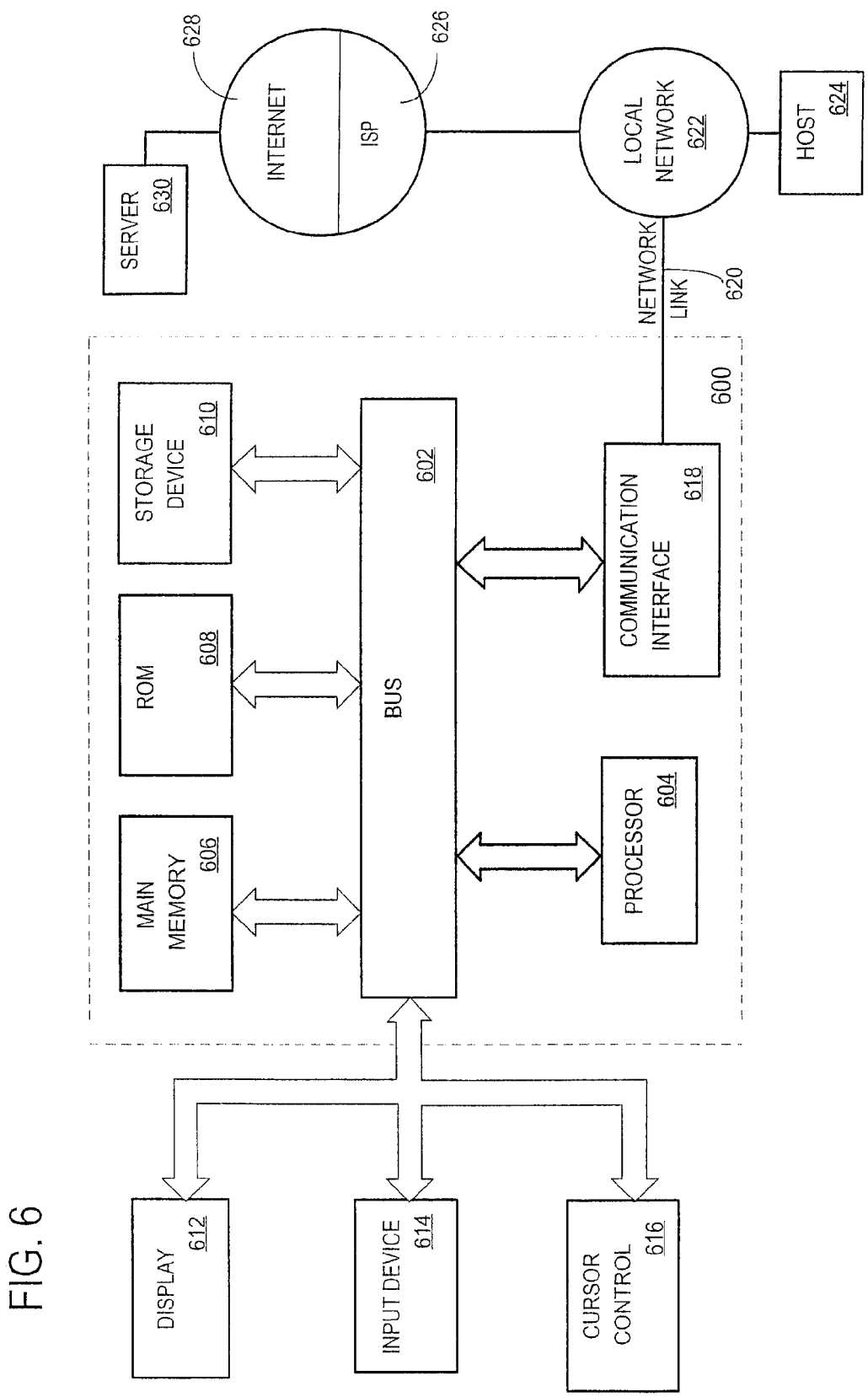
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining, at a routing service, a repository that includes a plurality of preference records;
    wherein each preference record, of the plurality of preference records:
        is associated with a respective user,
        specifies intent data that indicates one or more types of events about which the respective user desires to receive information, and
        corresponds to at least one respective device;
    receiving, at the routing service, a send event from a particular tenant service provider, wherein the send event includes at least:

a particular intent identifier that identifies a type of event with which the send event is associated, and
a particular payload;
wherein the send event does not indicate any particular device to which the particular payload is to be sent;
performing a comparison between the intent data in each of the plurality of preference records and the intent identifier in the send event;
based on the comparison, selecting a particular set of preference records;
wherein the intent data in each preference record in the particular set of preference records matches the particular intent identifier; and
after selecting the particular set of preference records, for each selected preference record, the routing service sending the particular payload to the at least one respective device that corresponds to the selected preference record.

2. The method of claim 1, wherein:
one or more preference records, of the plurality of preference records, specify application identifiers;
the send event includes a particular application identifier;
the method further comprises performing a second comparison between:
application identifiers in the one or more preference records, and the intent identifier in the send event; and
the step of selecting the particular set of preference records is further based, at least in part, on the second comparison.

3. The method of claim 2 comprising:
storing, at the routing service, a tenant identifier;
storing, at the routing service, an application identifier;
associating the application identifier with the tenant identifier;
wherein the send event also includes the tenant identifier;
determining that the particular application identifier included in the send event is associated with the tenant identifier;
wherein the routing service sends the particular payload only after determining that the particular application identifier included in the send event is associated with the tenant identifier.

4. The method of claim 1 comprising:
receiving, at the routing service, a set of preference information for a certain device and a certain user, wherein the set of preference information includes:
a device identifier that identifies the certain device;
a user identifier that identifies the certain user of the certain device;
a certain application identifier that identifies an application, on the certain device with the certain user, that designed to receive a certain type of information; and
certain intent data that corresponds to the certain type of information.

5. The method of claim 4 wherein the particular tenant service provider does not maintain any data indicating that the certain device is to receive the certain type of information.

6. The method of claim 4, wherein:
the set of preference information includes a device type identifier that identifies a particular type of device;
a first device type is identified by a first record in the particular set of preference records;
a second device type is identified by a second record in the particular set of preference records; and
the method further comprises:
based on the first record, sending the particular payload to a recipient associated with the first record using a first protocol; and
based on the second record, sending the particular payload to a recipient associated with the second record using a second protocol.

7. The method of claim 4 wherein the certain device is a mobile device.

8. The method of claim 4, wherein:
the set of preference information is a first set of preference information;
the certain intent data is first certain intent data;
the certain type of information is a first type of information; and
the method further comprising:
receiving, at the routing service, a second set of preference information for the certain device and the certain user, wherein the second set of preference information includes second certain intent data that corresponds to a second certain type of information.

9. The method of claim 4, wherein:
the set of preference information specifies a condition;
the set of preference information is stored as a particular preference record in the repository;
the particular preference record is one of the particular set of preference records;
the routing service sends, for the particular preference record, the particular payload to the certain device only if the condition in the particular preference record is satisfied.

10. The method of claim 4, wherein:
the set of preference information specifies a condition;
the set of preference information is stored as a particular preference record in the repository;
the particular preference record is selected to be one of the particular set of preference records based, at least in part, on the send event satisfying the condition in the particular preference record.

11. The method of claim 4, wherein:
the set of preference information includes a condition;
the condition is a particular time period; and
the routing service determines whether to send the particular payload to the certain device based, at least in part, on whether current time is within the particular time period.

12. The method of claim 4 wherein the certain intent data is one of a plurality of intent identifiers included in the set of preference information received, at the routing service, from the certain device.

13. One or more non-transitory computer-readable medium storing instructions which, when executed by one or more processors, cause performance of a method comprising:
maintaining, at a routing service, a repository that includes a plurality of preference records;
wherein each preference record, of the plurality of preference records:
is associated with a respective user,
specifies intent data that indicates one or more types of events about which the respective user desires to receive information, and
corresponds to at least one respective device;
receiving, at the routing service, a send event from a particular tenant service provider, wherein the send event includes at least:
a particular intent identifier that identifies a type of event with which the send event is associated, and
a particular payload;

wherein the send event does not indicate any particular device to which the particular payload is to be sent;

performing a comparison between the intent data in each of the plurality of preference records and the intent identifier in the send event;

based on the comparison, selecting a particular set of preference records;

wherein the intent data in each preference record in the particular set of preference records matches the particular intent identifier; and after selecting the particular set of preference records, for each selected preference record, the routing service sending the particular payload to the at least one respective device that corresponds to the selected preference record.

14. The one or more non-transitory computer-readable medium of claim 13, wherein:

one or more preference records, of the plurality of preference records, specify application identifiers;

the send event includes a particular application identifier;

the method further comprises performing a second comparison between:

application identifiers in the one or more preference records, and the intent identifier in the send event; and the step of selecting the particular set of preference records is further based, at least in part, on the second comparison.

15. The one or more non-transitory computer-readable medium of claim 14, the method comprising:

storing, at the routing service, a tenant identifier;

storing, at the routing service, an application identifier;

associating the application identifier with the tenant identifier;

wherein the send event also includes the tenant identifier;

determining that the particular application identifier included in the send event is associated with the tenant identifier;

wherein the routing service sends the particular payload only after determining that the particular application identifier included in the send event is associated with the tenant identifier.

16. The one or more non-transitory computer-readable medium of claim 13, the method comprising:

receiving, at the routing service, a set of preference information for a certain device and a certain user, wherein the set of preference information includes:

a device identifier that identifies the certain device;

a user identifier that identifies the certain user of the certain device;

a certain application identifier that identifies an application, on the certain device with the certain user, that designed to receive a certain type of information; and certain intent data that corresponds to the certain type of information.

17. The one or more non-transitory computer-readable medium of claim 16, wherein the particular tenant service provider does not maintain any data indicating that the certain device is to receive the certain type of information.

18. The one or more non-transitory computer-readable medium of claim 16, wherein:

the set of preference information includes a device type identifier that identifies a particular type of device;

a first device type is identified by a first record in the particular set of preference records;

a second device type is identified by a second record in the particular set of preference records; and the method further comprises:

based on the first record, sending the particular payload to a recipient associated with the first record using a first protocol; and based on the second record, sending the particular payload to a recipient associated with the second record using a second protocol.

19. The one or more non-transitory computer-readable medium of claim 16, wherein the certain device is a mobile device.

20. The one or more non-transitory computer-readable medium of claim 16, wherein:

the set of preference information is a first set of preference information;

the certain intent data is first certain intent data;

the certain type of information is a first type of information; and the method further comprising:

receiving, at the routing service, a second set of preference information for the certain device and the certain user, wherein the second set of preference information includes second certain intent data that corresponds to a second certain type of information.

21. The one or more non-transitory computer-readable medium of claim 16, wherein:

the set of preference information specifies a condition;

the set of preference information is stored as a particular preference record in the repository;

the particular preference record is one of the particular set of preference records;

the routing service sends, for the particular preference record, the particular payload to the certain device only if the condition in the particular preference record is satisfied.

22. The one or more non-transitory computer-readable medium of claim 16, wherein:

the set of preference information specifies a condition;

the set of preference information is stored as a particular preference record in the repository;

the particular preference record is selected to be one of the particular set of preference records based, at least in part, on the send event satisfying the condition in the particular preference record.

23. The one or more non-transitory computer-readable medium of claim 16, wherein:

the set of preference information includes a condition;

the condition is a particular time period; and the routing service determines whether to send the particular payload to the certain device based, at least in part, on whether current time is within the particular time period.

24. The one or more non-transitory computer-readable medium of claim 16, wherein the certain intent data is one of a plurality of intent identifiers included in the set of preference information received, at the routing service, from the certain device.

* * * * *